United States Patent [19]

Takebe et al.

[11] Patent Number: 4,935,731

[45] Date of Patent: Jun. 19, 1990

[54] IMAGE DISPLAY APPARATUS

[75] Inventors: Hideharu Takebe; Akihiko Ishimoto, both of Hyogo, Japan

[73] Assignee: Mitsubishi Denki Kabushiki Kaisha, Tokyo, Japan

[21] Appl. No.: 275,806

[22] Filed: Nov. 23, 1988

[30] Foreign Application Priority Data

Dec. 9, 1987 [JP] Japan ................................ 62-312802

[51] Int. Cl.[5] ................................................ G06F 3/14

[52] U.S. Cl. .................................... 340/814; 340/731

[58] Field of Search ............... 340/728, 731, 750, 748, 340/798, 799, 749, 814, 813, 800; 358/451, 442

[56] References Cited

U.S. PATENT DOCUMENTS 4,121,283 10/1978 Walker ................................ 340/799

4,282,555 8/1981 Coviello ............................ 358/451

*Primary Examiner*—Alvin Oberley

*Attorney, Agent, or Firm*—Townsend and Townsend

[57] ABSTRACT

An image display apparatus is disclosed, in which a programmable counter is provided with a separate counter with the output thereof varied cyclically with the counting of horizontal sync signal pulses, the output of the counter is used to cull out the horizontal sync signal pulses supplied to the programmable counter, and pixel data of the same line is read out from a reflesh memory at least twice in a period, in which the input is culled. A display on a display panel having a fixed display resolution thus is obtained of display data of a lower resolution than the fixed display screen resolution.

4 Claims, 6 Drawing Sheets

WHEN THE INPUT 124 IS AT "H" LEVEL AND THE INPUT 125 IS AT "L" LEVEL.

WHEN THE INPUT 124 IS AT "L" LEVEL AND THE INPUT 125 IS AT "H" LEVEL.

WHEN THE INPUT 124 IS AT "H" LEVEL AND THE INPUT 125 IS AT "H" LEVEL.

IMAGE DISPLAY APPARATUS

BACKGROUND OF THE INVENTION

1. Field of the Invention

This invention relates to an image display apparatus having a fixed display screen resolution and, more particularly, to an image display apparatus using a liquid crystal or plasma display panel.

2. Description of the Prior Art

Recently, technical innovation and price reduction are being in progress in the field of display panels such as liquid crystal and plasma display panels, and portable personal computers utilizing these display panels are becoming popular.

Up to date, a variety of software inclusive of those developed in the past in available for use with personal computers. Generally, however, the display screen resolution corresponding to the software developed in the past is lower than that of newly developed software. Therefore, there are a plurality of different display screen resolutions corresponding to software utilized for one personal computer. In the meantime, a display panel usually has a fixed display screen resolution. If such a display panel is used with software having a lower display screen resolution, a lower size display is obtained than the display screen size of the display panel. By way of example, 640-dot-by-200-dot display data is displayed using a display panel having a resolution of 640 dots by 480 dots, the display size is reduced to 5/12, i.e., approximately one half, of the available display screen size, as shown in FIG. 2, with 7/12 of the screen being a non-display area. Such a display, which is reduced in size, can be seen unsatisfactorily, so that the feature of the high resolution display panel is sacrified.

SUMMARY OF THE INVENTION

The present invention has been intended to solve the above problems, and its object is to provide an image display apparatus, which permits a satisfactory full panel size display on a display panel having a fixed display resolution to be obtained of display data of a lower resolution than the fixed display screen resolution as well.

According to the invention, there is provided an image display apparatus, in which an address generator for a refresh for preserving display screen pixel data includes a programmable counter for receiving as input clock at least the display screen sync signal, an address converter for receiving the output of the programmable counter and generating a corresponding address of the refresh memory, in which pixel data for a corresponding display position is preserved, at least one counter for receiving as input clock a horizontal sync signal, and an output control circuit for receiving the output of the counter and providing to the programmable counter an inhibition signal for inhibiting the input pulses of the horizontal sync signal as input clock.

The above and other objects and advantages of the invention will become more apparent from the following description taken in conjunction with the accompanying drawings.

DESCRIPTION OF THE PREFERRED EMBODIMENT

Figure 1:
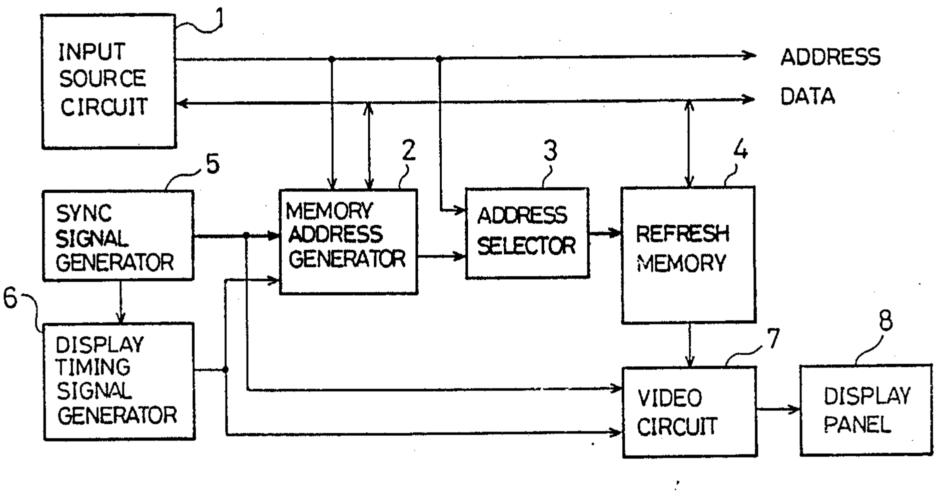
FIG. 1 is a block diagram showing an embodiment of the invention.
Figure 2:
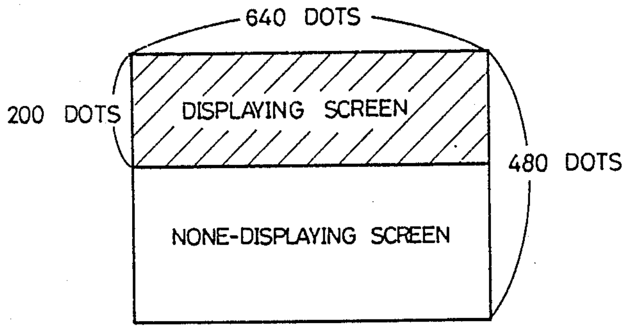
FIG. 2 is a front view showing an example of display screen corresponding to a prior art system.

FIG. 1 is a block diagram showing an embodiment of the image display apparatus according to the invention. Referring to the Figure, reference numeral 1 designates an input source circuit consisting of a microprocessor or the like for supplying pixel data to a refresh memory 4. Reference 2 designates a memory address generator for providing address data to the refresh memory 4, in which pixel data for display is preserved, in response to signals received from display screen sync signal generator 5 and display timing signal generator 6. An address selector 3 is provided for selecting an address of the input source circuit 1 when the input source, circuit 1 reads data from and writes data in the refresh memory 4 and selects the output of the memory address generator 2 when pixel data is read out from the refresh memory 4 for display. Pixel data read out from the refresh memory 4 according to the output address of the memory address generator 2, is supplied to a video circuit 7 for conversion to a signal conforming to the input form of a display panel 8 in synchronism to sync signals.

Figure 3:
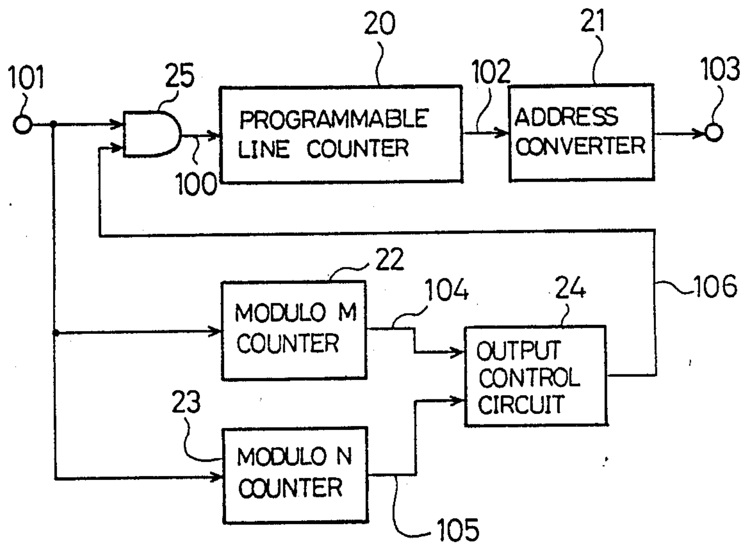
FIG. 3 is a block diagram showing an example of address control circuit according to the invention.

FIG. 3 shows an example of the memory address generator shown in FIG. 1. Referring to the Figure, reference numeral 20 designates a programmable line counter for up-counting input pulses 100. The output 102 of the programmable line counter 20 is supplied to an address converter 21 for conversion to an address of the refresh memory 4, the converted signal being provided as signal 103. Meanwhile, a horizontal sync signal 101 is supplied as a clock to module M and module N counters 22 and 23. The outputs 104 and 105 of the module M and module N counters 22 and 23 are supplied to the output control circuit 24. The output 106 of an output control circuit 24 constitutes one input to an AND gate 25. In other words, the input of a horizontal sync signal 101 to the programmable line counter 20 is inhibited while the output of the output control circuit 24 is at a low, i.e., "L", level.

Figure 4:
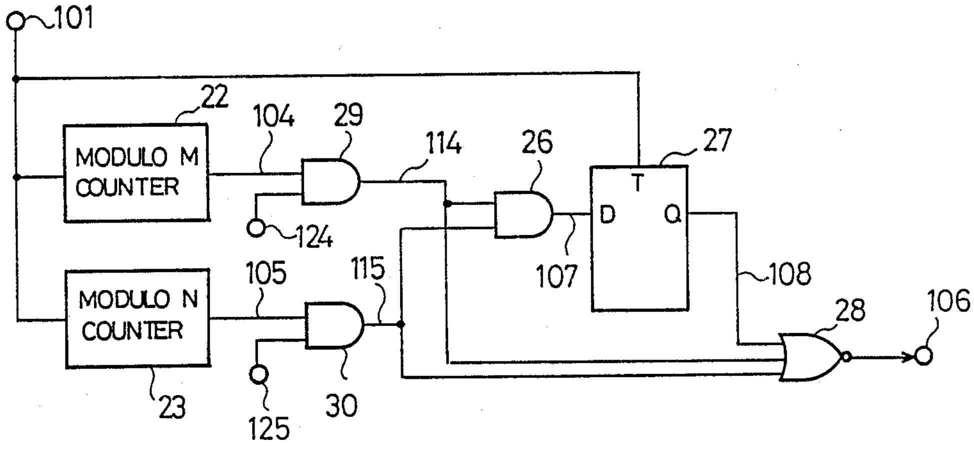
FIG. 4 is a block diagram showing an example of output control circuit according to the invention.

FIG. 4 is an embodiment of the output control circuit 24 shown in FIG. 3 Referring to the Figure, reference numeral 26 designates a two-input AND gate for receiving the outputs 114 and 115 of AND gates 29 and 30. The output of the AND gate 26 is supplied as a D input 107 to a D-type flip-flop 27. As a clock for the D-type flip-flop 27 a horizontal sync signal 101 is supplied, and in synchronism to the falling of the signal pulse 101 the input 107 is provided as an output 108. Reference numeral 28 designates a three-input NOR gate for receiving the output 108 of the D-type flip-flop 27 and outputs 104 and 105 of the module M and module N counters 22 and 23. The output of the NOR gate 28 is supplied as an input 106 to the AND gate 25. If at least one of the three inputs 114,115 and 108 to the NOR gate 28 is at a high, i.e., "H", level, the output 106 is at "L" level, and the horizontal sync signal 101 is not supplied as clock to the programmable line counter 20.

The outputs 114 and 115 of the AND gates 29 and 30 are controlled by inputs 124 and 125, and only when these inputs 124 and 125 are at "H" level, the outputs 104 and 105 of the module M and module N counters 22 and 23 are transmitted to the outputs 114 and 115 of the AND gates 29 and 30.

Figure 5:
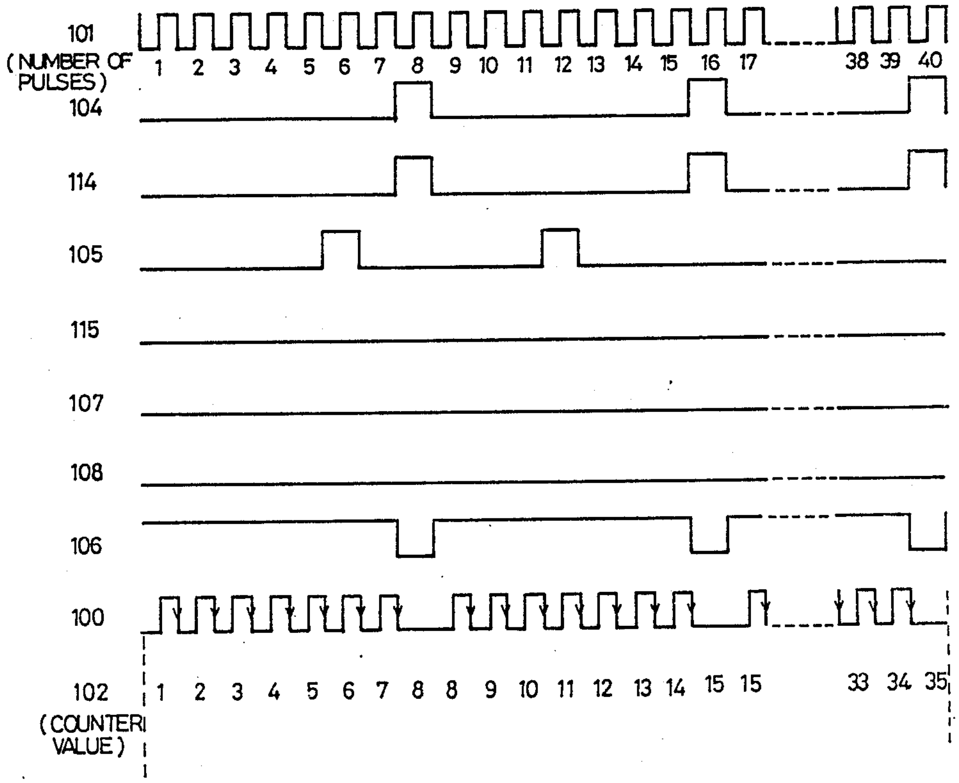
FIGS. 5*a–c* are timing charts for explaining the embodiment of the invention.

FIG. 5 shows timing charts for explaining the operation of the embodiment of the invention shown in FIGS. 1, 3 and 4. In this case, the module M and module N counters are respectively module 8 and module 6 counters.

FIG. 5(*a*) is a timing chart in case when image screen data consisting of 350 vertical lines is displayed as 400-vertical-line data on a 400-vertical-line screen. In this case, the programmable line counter 20 is set to module 35. Further, since the input 125 is at "L" level, the output 105 of the module N (i.e., 6) counter 23 is at "L" level and not transmitted to the output 115 of the AND gate 30. Further, since the output 115 is at "L" level, the output 108 of the D-type flip-flop 27 is at "L" level. Meanwhile, since the input 124 is at "H" level, the output 104 of module M (i.e., 8) counter 22 is transmitted to the output 114 of the AND gate 29. Thus, the output 106 of the NOR gate 28 has the opposite polarity to that of the output 114. More specifically, the output 106 is at "L" level for one clock period every time 8 horizontal sync signal pulses 101 are counted and is otherwise at "H" level. Thus, in the output 100 of the AND gate 25 one pulse is missing for every 8 horizontal sync signal pulses 101, and the count of the programmable line counter 20 remains the same for a two-pulse period, in which one pulse is missing. The output 102 of the programmable line counter 20 is supplied to the address converter 21, and the output thereof controls the address of the refresh memory 4. Thus, for a period of the input 100, in which one horizontal sync pulse is missing, pixel data in the refresh memory 4 for the same display line is read out for display for a period covering two pulses. In other words, in the case of FIG. 5(*a*), the pixel data of the 8-th display line is displayed for both the 8-th and 9-th display lines of the display screen. That is, pixel data for 35 lines is displayed for 40 display lines, that is 400-line display on a screen of 400 vertical lines is effected with pixel data for only 350 lines.

Figure 5B:
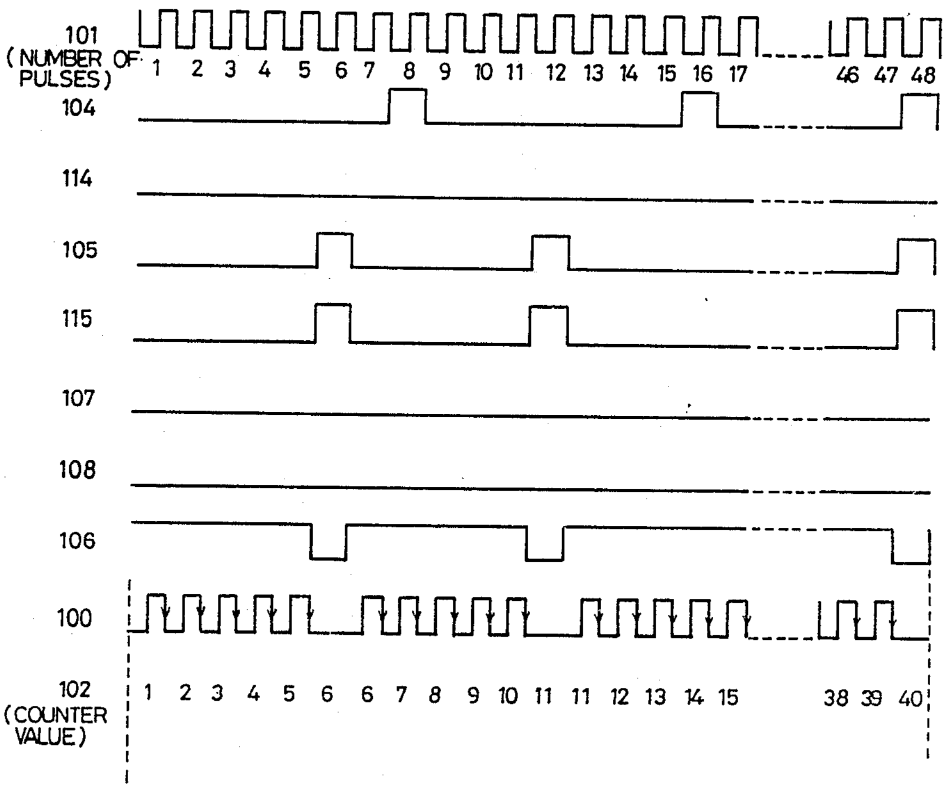
Figure 5:
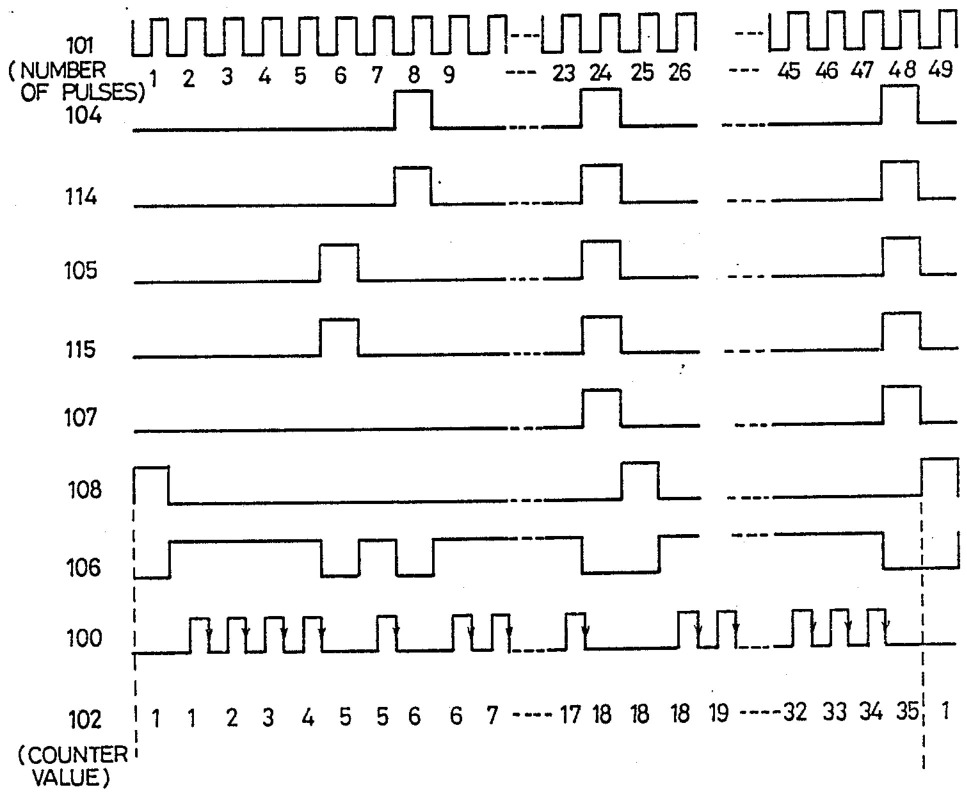

FIG. 5*b* is a timing chart in case when display data of 400 vertical lines is displayed as 480-line display on a screen of 480 vertical lines. In this case, the programmable line counter 20 is set to module 40. Further, since the input 124 is at "L" level, the output 104 of the module M (i.e., 8) counter 22 is at "L" level and is not transmitted to the output 114 of the AND gate 29. Since the output 114 is at "L" level, the output 107 of the AND gate 26 is at "L" level, and the output 108 of the D-type flip-flop 27 is at "L" level. Meanwhile, since the output 105 of the module N (i.e., 6) counter 23 is transmitted to the output 115 of the AND gate 30. Thus, the output 106 of the NOR gate 28 has the opposite polarity to the output 115. That is, the output 106 is at "L" level for one clock period every time 6 horizontal sync pulses 101 are counted and is otherwise at "H" level. Thus, in the output 100 of the AND gate 25 one pulse is missing for every 6 horizontal sync pulses 101, and the count of the programmable line counter 20 remains the same for a two-pulse period, in which one pulse is missing. The output 102 of the programmable line counter 20 is supplied to the address converter 21, and the output thereof controls the address of the refresh memory 4. Thus, for a period of the input 100, in which one horizontal sync pulse is missing, pixel data in the refresh memory 4 for the same display line is read out for display is read out for display for a period covering two pulses. In other words, in the case of FIG. 5(2), the pixel data of the 6-th display line is displayed for the 6-th and 7-th display lines of the display screen. That is, pixel data for 40 lines is displayed for 48 display lines, that is, 400-line display on a screen of 480 vertical lines is effected with pixel data for only 400 lines.

FIG. 5*c* is a timing chart in case when display data of 350 vertical lines is displayed as 480-line display on a screen of 480 vertical lines. In this case, the programmable line counter 20 is set to modulo 35. Since the inputs 124 and 125 are both at "H" level, the outputs 104 and 105 of the modulo M (i.e., 8) and modulo N (i.e., 6 counters 22 and 23 are transmitted to the outputs 114 and 115 of the AND gates 29 and 30, respectively. Meanwhile, the outputs 114 and 115 are simultaneously at "H" level for a one pulse period for every 24 horizontal sync pulses, so that the output 107 of the AND gate 26 is provided likewise. Thus, the output 108 of the D-type flip-flop 27 lags behind the input 107 by one clock period. The NOR gate 28 provides the output 106 from the inputs 108, 114 and 115. It will be seen that, as shown in FIG. 5(*c*), while 48 horizontal sync signal pulses appear, i.e., while pixel data for 48 vertical lines is displayed, the count of the programmable counter 20 is incremented by 35 steps, and pixel data for 35 lines is read out from the refresh memory 4. This means that pixel data for 350 lines can be displayed on a screen of 480 vertical lines. In this case, no exclusive counter is needed for conversion or expansion of 350 lines to 480 lines, and it is only necessary to provide a modulo 8 counter for expanding 350 lines to 400 lines, a modulo 6 counter for expanding 400 lines to 480 lines and a simple output control circuit as in the example shown in FIG. 4.

Figure 6:
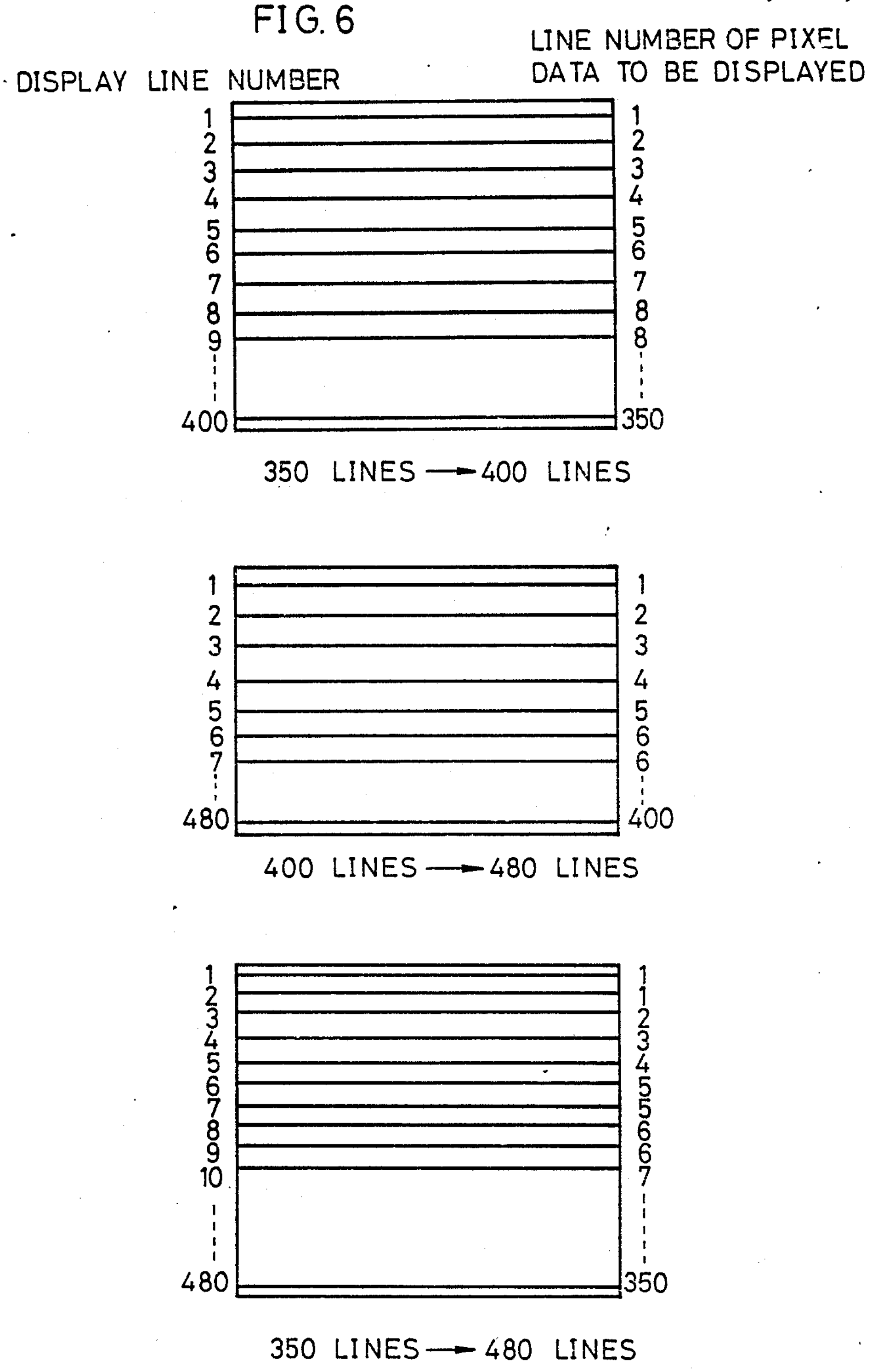
FIG. 6 shows a relation between the display line number and line number of display pixel data.

FIG. 6 shows the relation between display line number and line number of pixel data.

As has been described in the foregoing, with the image display apparatus according to the invention, the programmable counter is provided with a separate counter with the output thereof varied cyclically with the counting a horizontal sync signal pulses, the output of the counter is used to cull out the horizontal sync signal pulses supplied to the programmable counter, and pixel data of the same line is read out from the refresh memory at least twice in a period, in which the input is culled, thereby obtaining a display on a display panel having a fixed display resolution of display data of a lower resolution than the fixed screen resolution.

What is claimed is:

1. An image display apparatus comprising a display screen sync signal, generator, a display timing signal generator, a refresh memory for preserving display screen pixel data, an address generator for generating addresses of said refresh memory, a video circuit for converting pixel data read out from said refresh memory in correspondence to the display screen line to a video signal and a display medium for receiving and displaying the output of said video circuit, said address generator including a programmable counter for receiving as an input clock at least a horizontal sync signal from the display screen sync signal, an address converter for receiving the output of said programmable counter and generating a corresponding address of said refresh memory, in which pixel data for a corresponding display position is preserved, at least one counter for receiving as an input clock said horizontal sync signal, and an output control circuit for receiving the output of said counter and providing to said programmable counter an inhibition signal for inhibiting the up-counting of the input pulses of said horizontal sync signal as the input clock.

2. The image display apparatus according to claim 1, wherein said address generator includes the programmable counter for receiving as the input clock at least the horizontal sync signal, the address converter for generating the address of said refresh memory according to the output of said programmable counter, a modulo M, M being an integer, counter for receiving as the input clock said horizontal sync signal and the output control circuit for providing the up-counting inhibition signal to said programmable counter.

3. The image display apparatus according to claim 1, wherein said address generator includes the programmable counter for receiving as the input clock at least the horizontal sync signal, the address converter for generating the address of said refresh memory according to the output of said programmable counter, modulo M and modulo N, M and N being integers, counters for receiving as the input clock said horizontal sync and the output control circuit for providing the upcounting inhibition signal to said programmable counter according to the outputs of said modulo M and modulo N counters while the counts of said modulo M and module N counters are representing specified numbers.

4. The image display apparatus according to claim 3, wherein said output control circuit includes a flip-flop for receiving the outputs of said modulo M and modulo N counters via an AND gate, a three-input NOR gate for receiving the output of said flip-flop and outputs of said modulo M and modulo N counters.

* * * * *